United States Patent
Cohen et al.

(10) Patent No.: US 12,181,960 B2
(45) Date of Patent: Dec. 31, 2024

(54) APPARATUS FOR ALARM INFORMATION DETERMINATION

(71) Applicant: ABB Schweiz AG, Baden (CH)

(72) Inventors: Andrew Cohen, Ludwigshafen am Rhein (DE); Martin Hollender, Dossenheim (DE); Nuo Li, Mannheim (DE); Moncef Chioua, Heidelberg (DE); Matthieu Lucke, Heidelberg (DE)

(73) Assignee: ABB Schweiz AG, Baden (CH)

( * ) Notice: Subject to any disclaimer, the term of this patent is extended or adjusted under 35 U.S.C. 154(b) by 291 days.

(21) Appl. No.: 17/159,177

(22) Filed: Jan. 27, 2021

(65) Prior Publication Data

US 2021/0149385 A1    May 20, 2021

Related U.S. Application Data

(63) Continuation of application No. PCT/EP2019/070878, filed on Aug. 2, 2019.

(30) Foreign Application Priority Data

Aug. 7, 2018 (EP) ..................................... 18187736

(51) Int. Cl.
- G06F 11/07 (2006.01)
- G05B 23/02 (2006.01)
- G06F 18/2113 (2023.01)

(52) U.S. Cl.
CPC .......... G06F 11/079 (2013.01); G05B 23/024 (2013.01); G05B 23/0272 (2013.01); G06F 18/2113 (2023.01)

(58) Field of Classification Search
CPC . G06F 11/079; G06F 18/2113; G05B 23/024; G05B 23/0272
See application file for complete search history.

(56) References Cited

U.S. PATENT DOCUMENTS

| | | | |
|---|---|---|---|
| 5,748,098 A | 5/1998 | Grace | |
| 2006/0074598 A1* | 4/2006 | Emigholz | C10G 47/36 702/185 |

(Continued)

FOREIGN PATENT DOCUMENTS

| | | |
|---|---|---|
| CN | 1121384 A | 4/1996 |
| CN | 101617348 A | 12/2009 |

(Continued)

OTHER PUBLICATIONS

T.Warren Liao "Clustering of time series data—a survey", Pattern Recognition Society, Jan. 25, 2005, pp. 1857-1874, Elsevier Ltd., USA.

(Continued)

*Primary Examiner* — John C Kuan
(74) *Attorney, Agent, or Firm* — Leydig, Voit & Mayer, Ltd.

(57) ABSTRACT

An apparatus for alarm information determination includes: an input unit; a processing unit; and an output unit. The input unit provides the processing unit with historical process control data, the process control data including a plurality of data signals, a plurality of alarm data, and data relating to an event of interest. The processing unit determines a plurality of correlation scores for the plurality of data signals paired with the plurality of alarm data, a correlation score being determined for a data signal paired with an alarm data, a high correlation score indicating a higher degree of correlation than a low correlation score. The processing unit identifies at least one first alarm data from the plurality of alarm data, the identification including utilization of the data relating to the event of interest.

12 Claims, 4 Drawing Sheets

(56) References Cited

U.S. PATENT DOCUMENTS

| | | |
|---|---|---|
| 2008/0181099 A1 | 7/2008 | Torab et al. |
| 2009/0089233 A1 | 4/2009 | Gach et al. |
| 2009/0271348 A1 | 10/2009 | Allen et al. |
| 2010/0289638 A1 | 11/2010 | Borchers et al. |
| 2014/0336984 A1 | 11/2014 | Starr |
| 2015/0186608 A1 | 7/2015 | Fuller et al. |
| 2016/0098018 A1 | 4/2016 | Van Camp |
| 2016/0320768 A1* | 11/2016 | Zhao ................. G05B 23/0281 |
| 2016/0328954 A1 | 11/2016 | Ramadoss et al. |
| 2018/0196837 A1* | 7/2018 | Anand ................ G06F 11/3409 |
| 2019/0129395 A1* | 5/2019 | Niemiec ............ G05B 23/0235 |

FOREIGN PATENT DOCUMENTS

| | | | |
|---|---|---|---|
| CN | 101894446 A | | 11/2010 |
| CN | 101937225 A | | 1/2011 |
| CN | 102591321 A | | 7/2012 |
| CN | 102663873 A | | 9/2012 |
| CN | 105335489 A | * 2/2016 | ........... G06F 16/284 |
| CN | 106125712 A | | 11/2016 |
| DE | 19607607 A1 | | 9/1997 |
| EP | 3187950 A1 | | 7/2017 |
| JP | 2012-99067 A | | 5/2012 |
| JP | 2013-191141 A | | 9/2013 |
| JP | 2013-218725 A | | 10/2013 |
| JP | 2018-45637 A | | 3/2018 |
| WO | WO 2014209700 A1 | | 12/2014 |

OTHER PUBLICATIONS

Yang, Fan et al "Improved correlation analysis and visualization of industrial alarm data", Preprints of the 18th IFAC World Congress, Aug. 28-Sep. 2, 2011. pp. 12898-12903, International Federation of Automatic Control (IFAC), Milano, Italy.

Zhao et al., "An Approach to Process the Power Grid Alarm Based on the Rules of Experts and Information Theory," *Proceedings of the CSU-EPSA*, 26(12): 6 pp. (Dec. 31, 2014).

\* cited by examiner

Diagrams
Signal trends of interest (clustered)

Signal trends of interest (expanded)

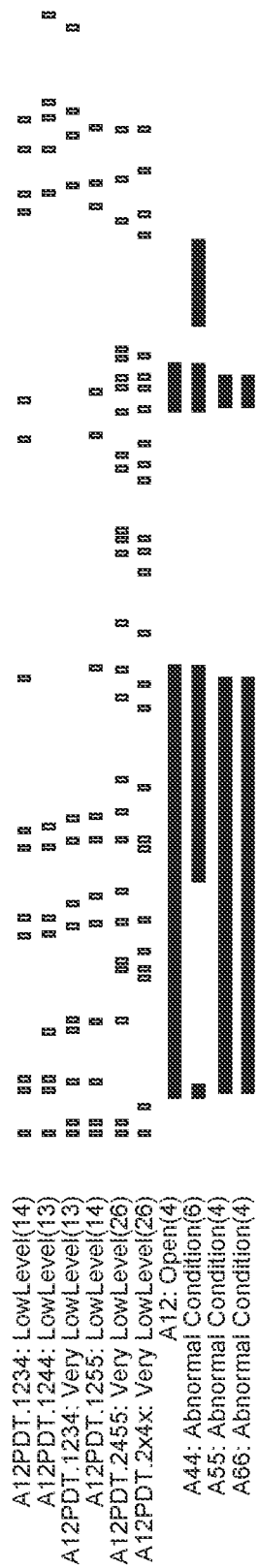

APPARATUS FOR ALARM INFORMATION DETERMINATION

CROSS-REFERENCE TO PRIOR APPLICATION

This application is a continuation of International Patent Application No. PCT/EP2019/070878, filed on Aug. 2, 2019, which claims priority to European Patent Application No. EP 18187736.6, filed on Aug. 7, 2018. The entire disclosure of both applications is hereby incorporated by reference herein.

FIELD

The project leading to this application has received funding from the European Union's Horizon 2020 research and innovation program under Marie Sklodowska-Curie grant agreement No 675215.

The present invention relates to an apparatus for alarm information determination, a method for alarm information determination, and to a computer program element and computer readable medium.

BACKGROUND

A process plant can have many process control systems, for example those used in chemical, petroleum and other industrial processes. One or more process controllers are communicatively coupled to various field devices such as valves, valve positioners, relays, switches, various sensors that monitor temperature, pressure, position, flow rates etc. The process controllers receive data signals indicative of process measurements made by the field devices, which can be used to generate control signals to implement control routines.

Users or operators in control rooms have access to information from the field devices and process controllers, and running appropriate software on computer systems are able to perform a variety of tasks, such viewing the current state of the process, changing an operating state, changing settings of a process control routine, modifying the operation of the process controllers and/or the field devices.

Furthermore, such process plants have numerous alarm systems that monitor the field devices and process controllers. Alarm data is also provided to the users and operators, and this forms an important aid identifying installation or process states that require immediate action. Since both individual components and subsystems of a control system are designed to generate alarms. Thus tens of thousands of data signals and alarm data can occur. However, if too many alarms are generated during serious situations, the user/operator may possibly be confused, and alarms which are actually important may remain unidentified or ignored in the flood of alarms. This is particularly problematic when an unusual alarm or event has just occurred or is occurring. There is a need to address this situation.

SUMMARY

In an embodiment, the present invention provides an apparatus for alarm information determination, comprising: an input unit; a processing unit; and an output unit, wherein the input unit is configured to provide the processing unit with historical process control data, the process control data comprising a plurality of data signals, a plurality of alarm data, and data relating to an event of interest, wherein the processing unit is configured to determine a plurality of correlation scores for the plurality of data signals paired with the plurality of alarm data, a correlation score being determined for a data signal paired with an alarm data, a high correlation score indicating a higher degree of correlation than a low correlation score, wherein the processing unit is configured to identify at least one first alarm data from the plurality of alarm data, the identification comprising utilization of the data relating to the event of interest, wherein the processing unit is configured to identify at least one first data signal from the plurality of data signals, the identification comprising utilization of the correlation scores for the identified at least first one alarm data paired with the plurality of data signals, and wherein the output unit is configured to output the at least one first data signal.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 6 shows an example of alarm occurrences arranged by similarity.

DETAILED DESCRIPTION

Figure 1:
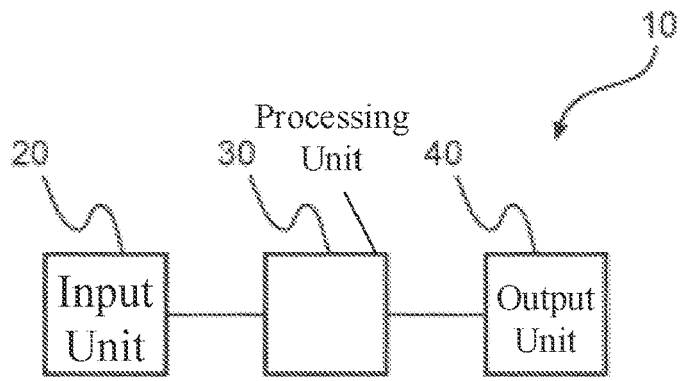
FIG. 1 shows a schematic representation of an example of an apparatus for alarm information determination.

In an embodiment, the present invention provides an improved technology for alarm information determination.

It should be noted that the following described aspects of the invention apply also for the apparatus for alarm information determination, the method for alarm information determination, as well as for the computer program element and storage medium.

In a first aspect, there is provided an apparatus for alarm information determination, comprising:

an input unit;
a processing unit; and
an output unit.

The input unit is configured to provide the processing unit with historical process control data. The process control data comprises a plurality of data signals, a plurality of alarm data and data relating to an event of interest. The processing unit is configured to determine a plurality of correlation scores for the plurality of data signals paired with the plurality of alarm data. a correlation score is determined for a data signal paired with an alarm data and wherein a high score indicates a higher degree of correlation than a low score. The processing unit is configured to identify at least one first alarm data from the plurality of alarm data, the identification comprising utilization of the data relating to the event of interest. The processing unit is utilized to identify at least one first data signal from the plurality of data signals, the identification comprising utilization of the correlation scores for the identified at least first one alarm data paired with the plurality of data signals. The output unit is configured to output the at least one first data signal.

In other words, an apparatus is provided for determining and visualizing related alarms, events and signal for an industrial process plant that enables the root cause of an unusual alarm or event to be determined. This enables a best course of action to remedy the situation to be determined.

Process plants can have many thousands of time varying data signals, with many alarms and events occurring, often coming in floods of events. However, only a few of these signals, alarms and events are relevant to a specific problem in the plant. Thus, the relevant alarm data associated with an event are displayed along with the relevant data signals, enabling a user to quickly identify the root cause of the problem, from which remedial action can be implemented, without an exhaustive and time-consuming search through the many data to determine an appropriate course of action being required.

In an example, identification of the at least one first data signal comprises a determination of one or more data signals of the plurality of data signals that have the highest correlation scores when paired with the at least one alarm data.

In an example, the processing unit is configured to determine a plurality of correlation scores for pairs of data signals of the plurality of data signals. A correlation score is determined for different pairs of data signals, wherein a high score indicates a higher degree of correlation between a pair of data signals than a low score. The processing unit is utilized to identify at least one second data signal of the plurality of data signals, the identification comprising utilization of the correlation scores for the identified at least one first data signal paired with the plurality of data signals. The output unit is configured to output the at least one second data.

In other words, an event of interest is used to determine relevant alarm indications, which are then used to indicate associated data signals. These data signals, are then used to determine other data signals that are correlated with these data signals, thereby providing a user with a simplified overview of what could be the root cause of the event of interest.

In an example, identification of the at least one second data signal comprises a determination of one or more data signals of the plurality of data signals that have the highest correlation scores when paired with the at least one first data signal.

In an example, the output unit is configured to output the one or more data signals. The input unit is configured to enable a user to select at least one data signal of the one or more data signals. The identified at least one second data signal can then be the at least one data signal selected by the user.

In this manner, a user is provided with a down-selection of data signals relating to an event of interest such as an unusual alarm or event, and the user can select the most relevant using their experience.

In an example, the processing unit is utilized to identify at least one second alarm data from the plurality of alarm data, the identification comprising utilization of the correlation scores for the identified at least one second data signal paired with the plurality of alarm data. The output unit is configured to output the at least one second alarm data.

In an example, identification of the at least one second alarm data comprises a determination of one or more alarm data of the plurality of alarm data that have the highest correlation scores when paired with the identified at least one second data signal.

In an example, the output unit is configured to output the one or more alarm data. The input unit is configured to enable a user to select at least one alarm data of the one or more alarm data, and wherein the identified at least one second alarm data can be the at least one alarm data selected by the user.

In this manner, information relating to an event, such as an unusual alarm, leads to a relevant data signals being presented to a user, which can be further refined by the user if necessary, and these data signal are used to provide information relating to the associated alarms to the user. With this information, the user can determine what the root cause of the unusual alarm is, and determine what remedial action is required.

In an example, the data relating to the event of interest comprises a user input query term. The processing unit is configured to utilize the query term to identify the at least one first alarm data.

In an example, the plurality of alarm data are stored in a database, and wherein the query term is utilized to identify the at least one first alarm data.

In other words, a user input query is parsed and translated into a query targeting an alarm database (for example, a historian, or a general-purpose data storage product such as a relational database, a NoSql document store etc), and the relevant alarms are identified corresponding to the query term input by the user. This is then used to identify relevant data signals.

In a second aspect, there is provided a method for alarm information determination, comprising:
a) providing a processing unit with historical process control data from an input unit, wherein the process control data comprises a plurality of data signals, a plurality of alarm data and data relating to an event of interest;
b) determining by the processing unit a plurality of correlation scores for the plurality of data signals paired with the plurality of alarm data, wherein a correlation score is determined for a data signal paired with an alarm data and wherein a high score indicates a higher degree of correlation than a low score;
c) identifying by the processing unit at least one first alarm data from the plurality of alarm data, the identification comprising utilization of the data relating to the event of interest;
d) identifying at least one first data signal from the plurality of data signals, the identification comprising the processing unit utilizing the correlation scores for the identified at least first one alarm data paired with the plurality of data signals; and
h) outputting by an output unit the at least one first data signal.

In an example, the method comprises step e) determining by the processing a plurality of correlation scores for pairs of data signals of the plurality of data signals, wherein a correlation score is determined for different pairs of data signals, wherein a high score indicates a higher degree of correlation between a pair of data signals than a low score; and wherein the method comprises step f) identifying at least one second data signal of the plurality of data signals, the identification comprising the processing unit utilizing the correlation scores for the identified at least one first data signal paired with the plurality of data signals; and wherein step h) comprises outputting the at least one second data.

In an example, the method comprises step g) identifying at least one second alarm data from the plurality of alarm data, the identification comprising the processing utilizing the correlation scores for the identified at least one second data signal paired with the plurality of alarm data; and wherein step h) comprises outputting the at least one second alarm data.

In an example, in step a) the data relating to the event of interest comprises a user input query term, and wherein step c) comprises utilizing the query term to identify the at least one first alarm data.

According to another aspect, there is provided a computer program element controlling apparatus as previously described which, when the computer program element is executed by a processing unit, is adapted to perform the method steps as previously described.

According to another aspect, there is also provided a computer readable medium having stored the computer element as previously described.

Advantageously, the benefits provided by any of the above aspects equally apply to all of the other aspects and vice versa.

The above aspects and examples will become apparent from and be elucidated with reference to the embodiments described hereinafter.

FIG. 1 shows an example of an apparatus 10 for alarm information determination. The apparatus 10 comprises an input unit 20, a processing unit 30, and an output unit 40. The input unit 20 is configured to provide the processing unit 30 with historical process control data. The process control data comprises a plurality of data signals, a plurality of alarm data and data relating to an event of interest. The processing unit 30 is configured to determine a plurality of correlation scores for the plurality of data signals paired with the plurality of alarm data. A correlation score is determined for a data signal paired with an alarm data and wherein a high score indicates a higher degree of correlation than a low score. The processing unit 30 is configured also to identify at least one first alarm data from the plurality of alarm data, the identification comprising utilization of the data relating to the event of interest. The processing unit 30 is utilized to identify at least one first data signal from the plurality of data signals, the identification comprising utilization of the correlation scores for the identified at least first one alarm data paired with the plurality of data signals. The output unit 40 is configured to output the at least one first data signal.

In an example, the process control data comprises engineering data, for example operator display information.

In an example, the data signals are temporal data.

In an example, the alarm data comprises temporal data.

According to an example, identification of the at least one first data signal comprises a determination of one or more data signals of the plurality of data signals that have the highest correlation scores when paired with the at least one alarm data.

According to an example, the processing unit is configured to determine a plurality of correlation scores for pairs of data signals of the plurality of data signals. A correlation score is determined for different pairs of data signals, wherein a high score indicates a higher degree of correlation between a pair of data signals than a low score. The processing unit is utilized to identify at least one second data signal of the plurality of data signals, the identification comprising utilization of the correlation scores for the identified at least one first data signal paired with the plurality of data signals. The output unit is configured to output the at least one second data.

According to an example, identification of the at least one second data signal comprises a determination of one or more data signals of the plurality of data signals that have the highest correlation scores when paired with the at least one first data signal.

According to an example, the output unit is configured to output the one or more data signals. The input unit is configured to enable a user to select at least one data signal of the one or more data signals. The identified at least one second data signal can then be the at least one data signal selected by the user.

According to an example, the processing unit is utilized to identify at least one second alarm data from the plurality of alarm data, the identification comprising utilization of the correlation scores for the identified at least one second data signal paired with the plurality of alarm data. The output unit is configured to output the at least one second alarm data.

According to an example, identification of the at least one second alarm data comprises a determination of one or more alarm data of the plurality of alarm data that have the highest correlation scores when paired with the identified at least one second data signal.

According to an example, the output unit is configured to output the one or more alarm data. The input unit is configured to enable a user to select at least one alarm data of the one or more alarm data, and wherein the identified at least one second alarm data can then be the at least one alarm data selected by the user.

According to an example, the data relating to the event of interest comprises a user input query term. The processing unit is configured to utilize the query term to identify the at least one first alarm data.

According to an example, the plurality of alarm data are stored in a database, and wherein the query term is utilized to identify the at least one first alarm data.

Figure 2:
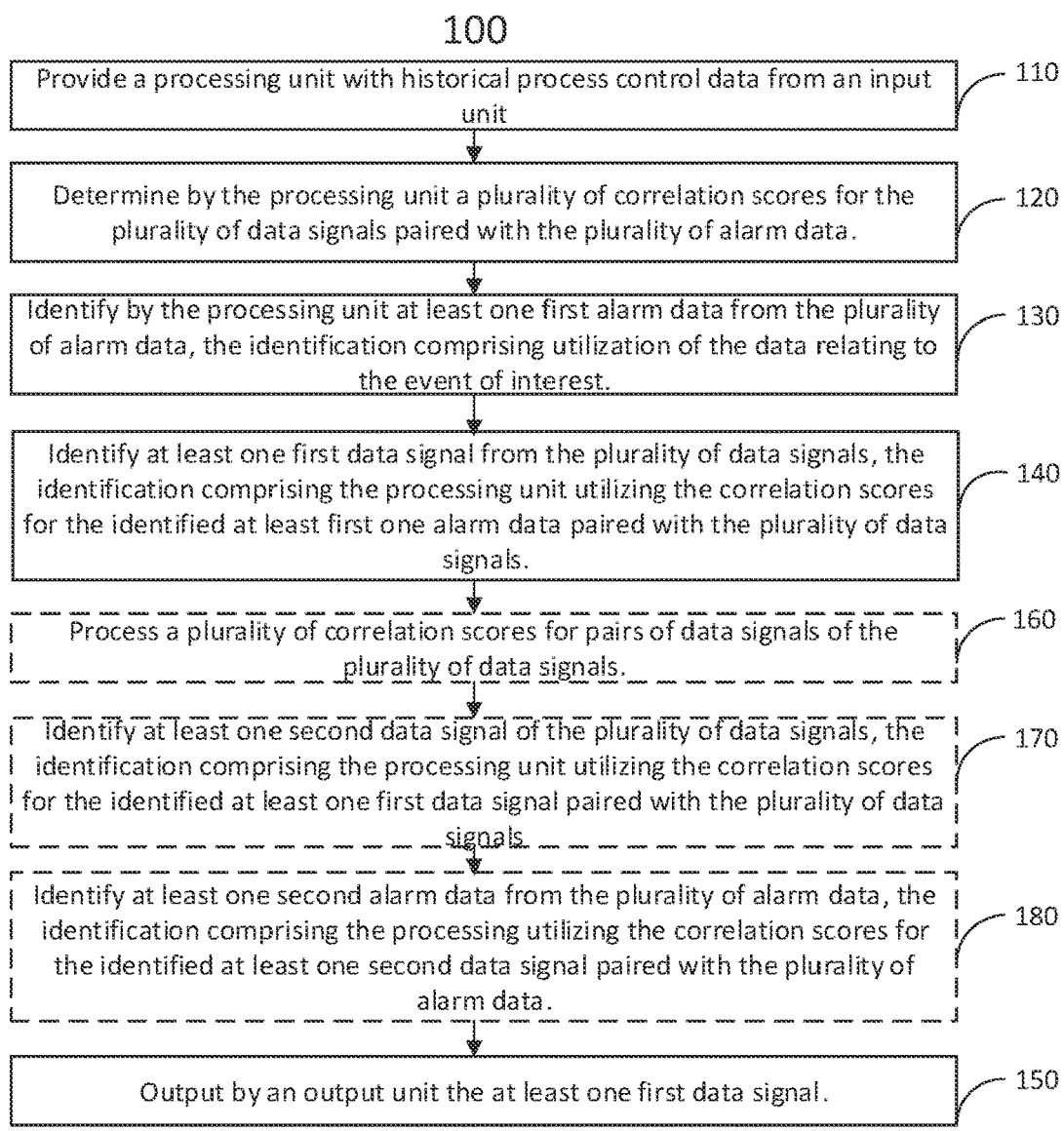
FIG. 2 shows a method for alarm information determination.

FIG. 2 shows a method 100 for alarm information determination in its basic steps where dashed boxes indicate optional method steps. The method 100 comprises:

in a providing step 110, also referred to as step a), providing a processing unit with historical process control data from an input unit, wherein the process control data comprises a plurality of data signals, a plurality of alarm data and data relating to an event of interest;

in a determining step 120, also referred to as step b), determining by the processing unit a plurality of correlation scores for the plurality of data signals paired with the plurality of alarm data, wherein a correlation score is determined for a data signal paired with an alarm data and wherein a high score indicates a higher degree of correlation than a low score;

in an identifying step 130, also referred to as step c), identifying by the processing unit at least one first alarm data from the plurality of alarm data, the identification comprising utilization of the data relating to the event of interest;

in an identifying step 140, also referred to as step d), identifying at least one first data signal from the plurality of data signals, the identification comprising the processing unit utilizing the correlation scores for the identified at least first one alarm data paired with the plurality of data signals; and in an outputting step 150, also referred to as step h), outputting by an output unit the at least one first data signal.

In an example, the data signals are temporal data.

In an example, the alarm data comprises temporal data.

In an example, step d) comprises determining one or more data signals of the plurality of data signals that have the highest correlation scores when paired with the at least one alarm data.

According to an example, the method comprises step e) determining 160 by the processing a plurality of correlation scores for pairs of data signals of the plurality of data signals. A correlation score is determined for different pairs of data signals, wherein a high score indicates a higher degree of correlation between a pair of data signals than a low score. The method then comprises step f) identifying 170 at least one second data signal of the plurality of data signals, the identification comprising the processing unit utilizing the correlation scores for the identified at least one first data signal paired with the plurality of data signals. Step h) then comprises outputting the at least one second data.

In an example, step f) comprises determining one or more data signals of the plurality of data signals that have the highest correlation scores when paired with the at least one first data signal.

In an example, step f) comprises outputting by the output unit the one or more data signals, wherein the input unit enables a user to select at least one data signal of the one or more data signals, and wherein the identified at least one second data signal is the at least one data signal selected by the user.

According to an example, the method comprises step g) identifying 180 at least one second alarm data from the plurality of alarm data, the identification comprising the processing utilizing the correlation scores for the identified at least one second data signal paired with the plurality of alarm data. Step h) then comprises outputting the at least one second alarm data.

In an example, step g) comprises determining one or more alarm data of the plurality of alarm data that have the highest correlation scores when paired with the identified at least one second data signal.

In an example, step g) comprises outputting the one or more alarm data, wherein the input unit enables a user to select at least one alarm data of the one or more alarm data, and wherein the identified at least one second alarm data is the at least one alarm data selected by the user.

According to an example, in step a) the data relating to the event of interest comprises a user input query term, and wherein step c) comprises utilizing the query term to identify the at least one first alarm data.

In an example, the plurality of alarm data are stored in a database, and wherein the query term is utilized to identify the at least one first alarm data.

The apparatus and method as described above with respect to FIGS. 1-2 are explained in specific detail with respect to FIGS. 3-6.

Finding the root cause and deciding on the best course of action to remedy an unusual alarm or event in industrial process plants is a challenging problem. But only does a process plant contain potentially tens of thousands of time varying signals, it also emits many alarms and events often in floods. However only very few of the signals, alarms, and events are relevant to a specific problem in the plant. This can lead to an exhaustive and time-consuming search for an appropriate course of action. The apparatus and method for alarm information determination addresses this situation, as described above with respect to FIGS. 1 and 2 and as now described in more detail with respect to a specific mode of operation.

In overview, a method/apparatus is provided to help the user find the root cause of an unusual event or occurrence in a plant, or find similar unusual events which occurred in the past through offering guided/contextual information, and by presenting the user with contextual information on similar/related signals to an alarm or event. A user can then iteratively explore and pinpoint a root cause or course of action.

Figure 5:
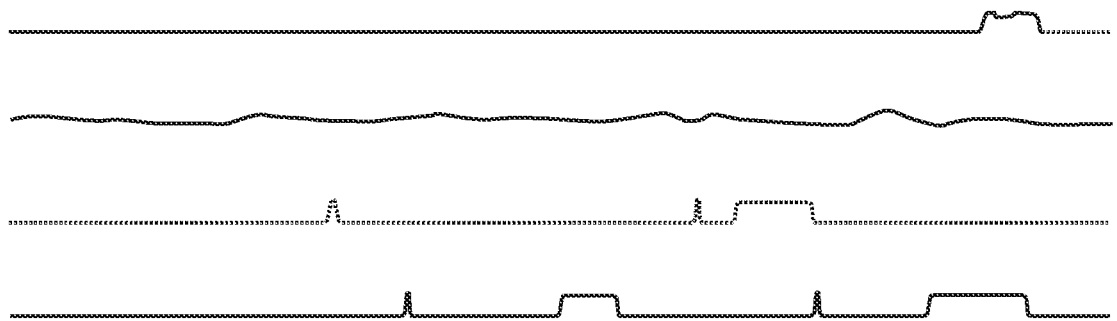
FIG. 5 shows an example of data signals in clustered and expanded forms.
Figure 5:
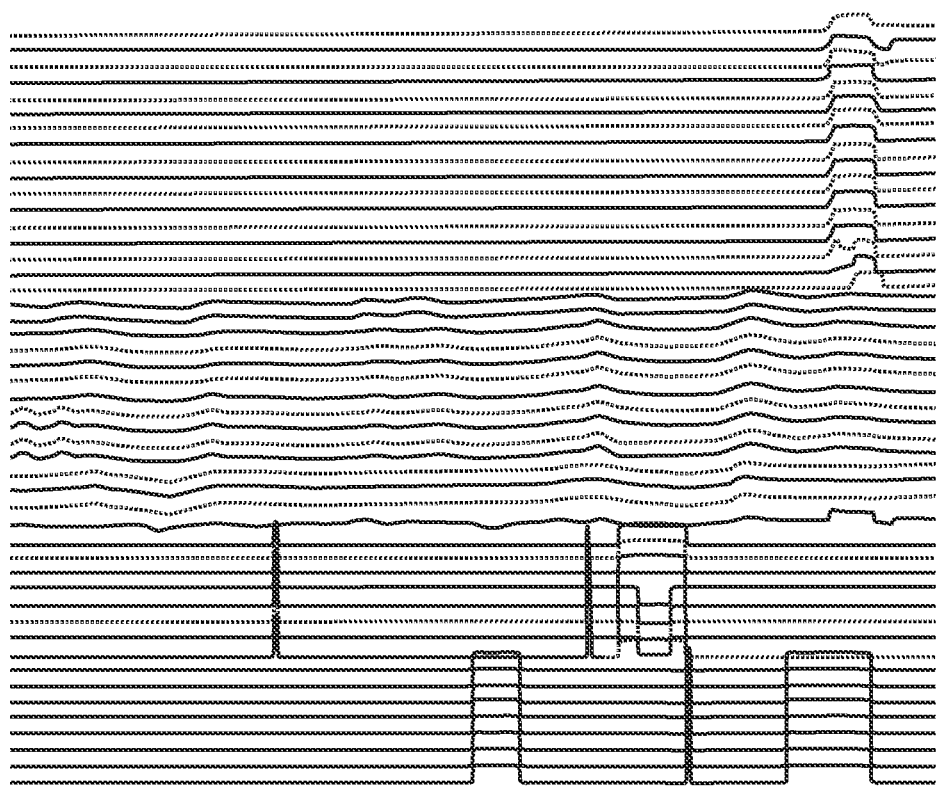

Detailed Operational Structure
1. Historical signal data, alarm and event data, and optionally engineering data (for example, operator display information) are made available to the apparatus;
2. Scores are computed between pairs/groups of signals. These scores can be based on several factors, which include both generic information and domain-knowledge. Such factors may include (note: this calculation can either be done in a bulk fashion or ad-hoc as a result of exploration from the user):
   a. (generic) similarities of the shapes of the time series data over specified intervals of time;
   b. (generic) other time-series clustering properties. This can make use of the techniques described in the paper by T. Warren Liao "Clustering of time series data—a survey", Pattern Recognition 38 (2005) 1857-1874;
   c. (generic) the history of previous explorations from all users in a user interface (previous investigations of signal X commonly led to queries on signal Y);
   d. (generic/domain-knowledge) similarity in identifiers, in particular with regard to semantic identifiers (including those defined in KKS (Kraftwerk-Kennzeichensystem)). For more information see IEC 6135-1 Classification and designation of documents for plants, systems and equipment, Fan Yang, et al, "Improved correlation analysis and visualization of industrial alarm data", ISA transactions 51.4 (2012) 499-506;
   e. (domain-knowledge) co-occurrence of signals on operator graphics (if available). These can potentially be prioritized by those entities displayed physically closer to each other on operator displays);
   f. (domain-knowledge) signals which have been manually tagged by an expert user as being related;
3. Scores are computed between alarms and events and signals. There are several methods for doing this. This calculation can either be done in a bulk fashion or ad-hoc as a result of exploration from the user:
   a. (generic) similarities of the alarm activations/return-to-normal and signal changes of interest (step changes, first- or second-order rise or decays, etc.);
   b. (domain-knowledge) co-occurrence of signals and alarms on operator graphics or other engineering information;
   c. (domain-knowledge) the definition of alarm;
   d. (combination) combining the other methods in bullet point 3 with those in bullet point 2. For example, if it is known from the engineering system that a signal (SignalA) is used in the definition of when to activate a certain alarm (AlarmA), other signals which are considered highly related to SignalA;
   e. Pairwise correlation coefficient can be calculated between each of the signals and/or time-shifted variants thereof. The pair getting the highest correlation will be shown first. Next comes the remaining signal with the highest correlation to the second signal and so on;
   f. Each alarm can be translated into a binary vector by slicing it into time intervals (e.g. 1 hour intervals) If the alarm was active during the interval, the vector gets a "1" and "0" otherwise. Then each vector is compared with each other vector. If both components contain a "1" the score is increased. If one contains a "0" and the other a "1" the score is decreased;
4. These scores can be used for clustering similar/related entities together (using any/multiple of the above-mentioned factors, or other factors). An example visualization for clustering similar signals is shown in FIG. 5;
5. Related entities are stored and can be either queried or triggered to be calculated in an ad-hoc fashion;
6. An end user has access to tools which allow him or her to:
   a. View alarms, events, and signals;
   b. Query alarms, events, and signals with descriptive queries, including but not limited to:
      i. Type of entity (Alarm, Event, Setpoint Change, etc);
      ii. Alarm duration;
      iii. Alarms which were active at a certain time (or started or ended before or after a time of interest);
   c. Sort alarms and events by several criteria in order to visually see patterns and pinpoint further areas to interactively explore. These criteria might include:
      i. First/last occurrence in a flood of events;
      ii. Similarity of occurrence patterns;

An example visualization of alarms sorted by a similarity metric is shown in FIG. 6.

From a given event, explore potentially-relevant signals occurring at the same time (these are calculated in main bullet point 3).

Mode of Use

A user starts from either a time period they are troubleshooting, or a particular (unusual) alarm or event which occurred. From there, the user can navigate through related alarms, events, and signals (which are sorted on relevant criteria) or are recommended to the user as a result of the calculations described in "Detailed Operational Structure".

A typical workflow is shown below:

A person is interested in knowing which set point changes made in a plant have led to increased or decreased alarms of a particular type. Using the described apparatus, the user could then:
1. Execute a query which returns back all setpoint changes and all alarms meeting their criteria of interest;
2. The apparatus shows these on a shared time axis, allowing patterns to be seen by visual inspection and/or by computing similarity measures between the alarms and events.

Detailed Example

Figures 3, 4:
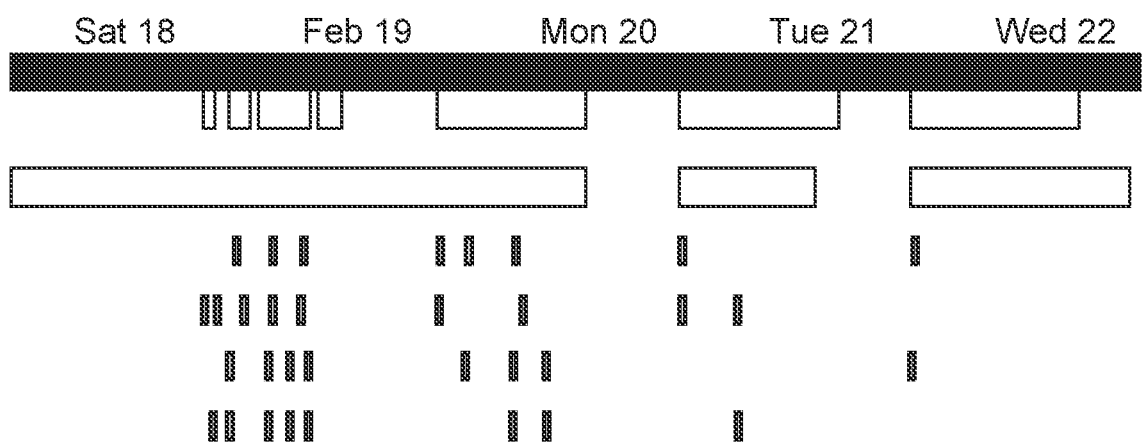
FIG. 3 shows an example of user input queries relating to an unusual event or alarm.
FIG. 4 shows a schematic representation of an example of sorting of alarms.

A detailed specific example is described in the following bullet points.
1. A user is interested in times when a manual setpoint change (done by an operator) may have led to new alarms and critical events occurring, possibly only in a portion of a plant (as designated by a KKS or other identifier);
2. The user uses the apparatus described herein, and enters one or more queries, as shown in FIG. 3;
3. These queries are parsed and translated into a query targeting the underlying alarm database (for example, a historian, or a general-purpose data storage product such as a relational database, a NoSql document store, etc);
4. The system displays the alarms and events for each query on a shared, synchronized view. In an industrial plant, tens of thousands of individual alarm occurrences could be present in the period of a few days, which could be overwhelming to find individual relationships of interest;
5. With this view, the alarms can be sorted by several criteria (example: similarity of occurrences—see bullet point 3 under "Detailed Operational Structure"). Such a view can guide the user to find potential causal relationships. This is shown in FIG. 4;
6. Once this is found, additional investigation into the associated signals can be done (see bullet point 2 under "Detailed Operational Structure").

FIG. 5 shows a clustered view of signal trends. Signals are automatically clustered based on similarity. These clusters can be shown to the user for diagnosis/drill down purposes or for anomaly detection, when a signal no longer exhibits similarity with the others for example.

Thus, the user or operator is guided to possibly interesting artefacts with the displaying recommendation of contextually relevant alarms, events and signals; uses given tools to quickly and further pinpoint their problem in an ad hoc fashion. In this manner, contextually relevant alarms, events and signals are determined and can be visualised by user, facilitating the implementation of remedial action to address an unusual event or alarm.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present invention, a computer readable medium, such as a CD-ROM, is presented wherein the computer readable medium has a computer program element stored on it which computer program element is described by the preceding section.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for alarm information determination, comprising:
    an input unit;
    a processing unit; and
    an output unit,
    wherein the input unit is configured to provide the processing unit with process control data, the process control data comprising a plurality of data signals, a plurality of alarm data, and data relating to an event of interest, wherein the data relating to the event of interest comprises a user input query term,
    wherein the processing unit is configured to determine a first plurality of correlation scores for the plurality of data signals paired with the plurality of alarm data, a correlation score being determined for a data signal paired with an alarm data, a high correlation score indicating a higher degree of correlation than a low correlation score,
    wherein the processing unit is configured to identify at least one first alarm data from the plurality of alarm data, the identification comprising utilization of the data relating to the event of interest, wherein the processing unit is configured to utilize the user input query term to identify the at least one first alarm data,
    wherein the user input query term is parsed and translated into a query targeting an alarm database to identify the at least one first alarm data,
    wherein the processing unit is configured to identify at least one first data signal from the plurality of data signals, the identification comprising utilization of the first plurality of correlation scores for the identified at least one first alarm data paired with the plurality of data signals, wherein identification of the at least one first data signal comprises a determination of one or more data signals of the plurality of data signals that have a first set of top correlation scores of the first plurality of correlation scores when paired with the at least one alarm data,
    wherein the output unit is configured to output the at least one first data signal,
    wherein outputting the at least one first data signal comprises generating a view of a plurality of clusters of the at least one signal data, each of the plurality of clusters exhibiting a similar signal trend, and
    wherein the view is used to detect anomalies in the at least one first data signal.

2. The apparatus according to claim 1, wherein the processing unit is configured to:
    determine a second plurality of correlation scores for pairs of data signals of the plurality of data signals,
    wherein each correlation score of the second plurality of correlation scores is determined for a pair of data signals,
    wherein a high correlation score of the second plurality of correlation scores indicates a higher degree of correlation between the pair of data signals than a low correlation score,
    wherein the processing unit is configured to identify at least one second data signal of the plurality of data signals, the identification comprising utilization of the second plurality of correlation scores for the identified at least one second data signal paired with the plurality of data signals, wherein identification of the at least one second data signal comprises a determination of one or more data signals of the plurality of data signals that have a second set of top correlation scores of the second plurality of correlation scores when paired with the at least one first data signal,
    wherein the output unit is configured to output the at least one second data signal,
    wherein outputting the at least one second data signal comprises generating a clustered view signal trend based on the at least one second data signal and a second subset of the plurality of data signals, and
    wherein the clustered view signal trend is used to detect anomalies in the at least one second data signal.

3. The apparatus according to claim 2, wherein the output unit is configured to output the one or more data signals,
    wherein the input unit is configured to enable a user to select at least one data signal of the one or more data signals, and
    wherein the identified at least one second data signal is the at least one data signal selected by the user.

4. The apparatus according to claim 2, wherein the processing unit is configured to identify at least one second alarm data from the plurality of alarm data, the identification comprising utilization of the first plurality of correlation scores for the identified at least one second data signal paired with the plurality of alarm data, wherein identification of the at least one second alarm data comprises a determination of one or more alarm data of the plurality of alarm data that has a third set of top correlation scores when paired with the identified at least one second data signal, and
wherein the output unit is configured to output the at least one second alarm data.

5. The apparatus according to claim 4, wherein the output unit is configured to output the one or more alarm data,
wherein the input unit is configured to enable a user to select at least one second alarm data of the one or more alarm data, and
wherein the identified at least one second alarm data is the at least one second alarm data selected by the user.

6. The apparatus according to claim 1, wherein the plurality of alarm data is stored in a database, and
wherein the user input query term is utilized to identify the at least one first alarm data.

7. The apparatus according to claim 1, wherein the first top correlation scores comprise a highest correlation score.

8. A method for alarm information determination, comprising:
a) providing a processing unit with process control data from an input unit, the process control data comprising a plurality of data signals, a plurality of alarm data, and data relating to an event of interest, wherein the data relating to the event of interest comprises a user input query term;
b) determining by the processing unit a first plurality of correlation scores for the plurality of data signals paired with the plurality of alarm data, a correlation score being determined for a data signal paired with an alarm data, a high correlation score indicating a higher degree of correlation than a low correlation score;
c) identifying by the processing unit at least one first alarm data from the plurality of alarm data, the identification comprising utilization of the data relating to the event of interest, wherein the identification comprises utilization of the user input query term, wherein the user input query term is parsed and translated into a query targeting an alarm database to identify the at least one first alarm data;
d) identifying at least one first data signal from the plurality of data signals, the identification comprising the processing unit utilizing the first plurality of correlation scores for the identified at least one first alarm data paired with the plurality of data signals, wherein the identifying comprises determining one or more data signals of the plurality of data signals that have a first set of top correlation scores of the first plurality of correlation scores when paired with the at least one alarm data;
h) outputting by an output unit the at least one first data signal,
wherein outputting the at least one first data signal comprises generating a view of a plurality of clusters of the at least one signal data, each of the plurality of clusters exhibiting a similar signal trend, and
wherein the view is used to detect anomalies in the at least one first data signal.

9. The method according to claim 8, wherein the method further comprises:
e) determining by the processing unit a second plurality of correlation scores for pairs of data signals of the plurality of data signals, each correlation score being determined for a pair of data signals, a high correlation score indicating a higher degree of correlation between a pair of data signals than a low correlation score; and
f) identifying at least one second data signal of the plurality of data signals, the identification comprising the processing unit utilizing the second plurality of correlation scores for the identified at least one second data signal paired with the plurality of data signals,
wherein step h) comprises outputting the at least one second data signal.

10. The method according claim 9, further comprising:
g) identifying at least one second alarm data from the plurality of alarm data, the identification comprising the processing unit utilizing the correlation scores for the identified at least one second data signal paired with the plurality of alarm data,
wherein step h) comprises outputting the at least one second alarm data.

11. A non-transitory computer-readable medium having processor executable instructions stored thereon, wherein the processor-executable instructions, when executed by one or more processors is configured to carry a method for alarm information determination, by:
a) providing the processing unit with process control data from an input unit, the process control data comprising the plurality of data signals, the plurality of alarm data, and data relating to the event of interest, wherein the data relating to the event of interest comprises a user input query term;
b) determining by the processing unit the plurality of correlation scores for the plurality of data signals paired with the plurality of alarm data, a correlation score being determined for the data signal paired with the alarm data, the high correlation score indicating the higher degree of correlation than the low correlation score;
c) identifying by the processing unit the at least one first alarm data from the plurality of alarm data, the identification comprising utilization of the data relating to the event of interest, wherein the processing unit is configured to utilize the user input query term to identify the at least one first alarm data, wherein the user input query term is parsed and translated into a query targeting an alarm database to identify the at least one first alarm data;
d) identifying the at least one first data signal from the plurality of data signals, the identification comprising the processing unit utilizing the correlation scores for the identified at least one first alarm data paired with the plurality of data signals, wherein identification of the at least one first data signal comprises a determination of one or more data signals of the plurality of data signals that have a set of top correlation scores of the plurality of correlation scores when paired with the at least one alarm data; and
h) outputting by the output unit the at least one first data signal, wherein outputting the at least one first data signal comprises generating a view of a plurality of clusters of the at least one signal data, each of the plurality of clusters exhibiting a similar signal trend, and
wherein the view is used to detect anomalies in the at least one first data signal.

12. An apparatus for alarm information determination, comprising:
an input unit;
a processing unit; and
an output unit,
wherein the input unit is configured to provide the processing unit with process control data, the process control data comprising a plurality of data signals, a plurality of alarm data, and data relating to an event of interest, wherein the data relating to the event of interest comprises a user input query term, wherein the processing unit is configured to determine a first plurality of correlation scores for the plurality of data signals paired with the plurality of alarm data, a correlation score being determined for a data signal paired with an alarm data, a high correlation score indicating a higher degree of correlation than a low correlation score, wherein the processing unit is configured to identify at least one first alarm data from the plurality of alarm data, the identification comprising utilization of the data relating to the event of interest, wherein the processing unit is configured to utilize the user input query term to identify the at least one first alarm data, wherein the processing unit is configured to identify at least one first data signal from the plurality of data signals, the identification comprising utilization of the first plurality of correlation scores for the identified at least one first alarm data paired with the plurality of data signals, wherein identification of the at least one first data signal comprises a determination of one or more data signals of the plurality of data signals that have a first set of top correlation scores of the first plurality of correlation scores when paired with the at least one alarm data, and wherein the output unit is configured to output the at least one first data signal, wherein the outputting the at least one first data signal comprises generating a view of a plurality of clusters of the at least one signal data, each of the plurality of clusters exhibiting a similar signal trend, wherein the view is used to detect anomalies in the at least one first data signal, wherein the processing unit is configured to determine a second plurality of correlation scores for pairs of data signals of the plurality of data signals, wherein each correlation score of the second plurality of correlation scores is determined for a pair of data signals, wherein a high correlation score of the second plurality of correlation scores indicates a higher degree of correlation between the pair of data signals than a low correlation score, wherein the processing unit is configured to identify at least one second data signal of the plurality of data signals, the identification comprising utilization of the second plurality of correlation scores for the identified at least one second data signal paired with the plurality of data signals, wherein identification of the at least one second data signal comprises a determination of one or more data signals of the plurality of data signals that have a second set of top correlation scores of the second plurality of correlation scores when paired with the at least one first data signal, wherein the output unit is configured to output the at least one second data signal, wherein the outputting the at least one first data signal comprises generating a second view of a second plurality of clusters of the at least one second signal data, each of the second plurality of clusters exhibiting a similar signal trend, and wherein the second view is used to detect anomalies in the at least one second data signal.

* * * * *